United States Patent [19]

Hügel et al.

[11] Patent Number: 5,204,607
[45] Date of Patent: Apr. 20, 1993

[54] PROCESS FOR CORRECTING THE REFERENCE FLUX OF A CONVERTER-POWERED MULTI-PHASE MACHINE AND CIRCUIT FOR IMPLEMENTING THE PROCESS

[75] Inventors: Harald Hügel, Herzofenaurach; Günther Schwesig, Erlangen, both of Fed. Rep. of Germany

[73] Assignee: Siemens Aktiengesellschaft, Berlin and Munich, Fed. Rep. of Germany

[21] Appl. No.: 838,415

[22] PCT Filed: Jul. 17, 1990

[86] PCT No.: PCT/DE90/00540

§ 371 Date: May 6, 1992

§ 102(e) Date: May 6, 1992

[87] PCT Pub. No.: WO91/03867

PCT Pub. Date: Mar. 21, 1991

[30] Foreign Application Priority Data

Sep. 7, 1989 [WO] PCT Int'l Appl. ........ DE89/00582

[51] Int. Cl.[5] .............................................. H02P 5/40
[52] U.S. Cl. ..................................... 318/806; 318/809
[58] Field of Search ............... 318/806, 808, 807, 803, 318/805, 811, 798, 809

[56] References Cited

U.S. PATENT DOCUMENTS

| | | | |
|---|---|---|---|
| 4,011,489 | 3/1977 | Franz et al. | 318/798 |
| 4,215,306 | 7/1980 | D'Atre | 318/803 |
| 4,388,577 | 6/1983 | Blaschke et al. | 318/717 |
| 4,445,080 | 4/1984 | Curtiss | 318/807 |
| 4,469,997 | 9/1984 | Curtiss et al. | 318/809 |
| 4,800,327 | 1/1989 | Fujioka et al. | 318/806 |

FOREIGN PATENT DOCUMENTS 0043973 1/1982 European Pat. Off. .

OTHER PUBLICATIONS

Automatisierungstechnische Praxis atp, vol. 29, No. 2, 1987, Klausecker & Schwesig, Erlangen: Eine Neue Generation Digital Geregelter Drehstrom-Hauptspindelantriebe, pp. 83-88.

Primary Examiner—William M. Shoop, Jr.
Assistant Examiner—John W. Cabeca
Attorney, Agent, or Firm—Kenyon & Kenyon

[57] ABSTRACT

The invention relates to a process and apparatus for correcting a pre-controlled reference flux for a field-oriented control comprising a reference voltage model of a converter-powered multi-phase machine with a speed detection device. According to the invention, a comparison between a reference voltage which is used for setting a converter and a predetermined maximum converter output voltage provides a voltage control difference. From this voltage control difference, a flux control value is generated by a flux correction controller, which reduces the pre-controlled reference flux until the reference voltage for the converter is lower than or equal to the predetermined maximum converter output voltage ($U_{wmax}$). As a result the field-oriented regulation never leaves the field-oriented range.

2 Claims, 3 Drawing Sheets

PROCESS FOR CORRECTING THE REFERENCE FLUX OF A CONVERTER-POWERED MULTI-PHASE MACHINE AND CIRCUIT FOR IMPLEMENTING THE PROCESS

BACKGROUND OF THE INVENTION

The invention relates to a process and apparatus for correcting a pre-controlled reference flux for a field-oriented control, comprising a reference current model and/or a reference voltage model and a converter-powered multi-phase machine with a speed detection device.

In the journal "Automatisierungstechnische Praxis atp," 29th year, Issue 2, 1987, pages 83 to 88, a converter-powered multi-pole machine, in particular rotary current asynchronous machine with a field-oriented control, is shown, where the regulation contains a reference current model and a reference voltage model. With this drive, the entire speed setting range is divided into three segments as seen in FIG. 1. Starting from therefor a zero speed 7 to a nominal speed $n_n$, constant torque M is required in the basic speed range. Correspondingly, the output P increase proportionally to the speed n, and constant values result for the flux-forming current component $I_1$, since the machine is operated at a nominal flux $\psi_n$. In the field weakening range I (speed range $n_n$ to $2n_n$), the voltage U is raised from a nominal value $U_n$ to its maximum value only at a constant output P, proportional to $\sqrt{n}$, which corresponds to a reduction of the magnetization in inverse proportion to $\sqrt{n}$. The moment-forming current component $I_2$ decreases in the same manner. At values larger than twice the nominal speed $n_n$ in the field weakening range II, the voltage U remains constant at the output of the converter. Its value lies approximately 3% below the maximum possible output voltage of the converter at full block operation, and at a predetermined intermediate circuit voltage, in order to maintain slight peak currents for the inverter. With a constant output P, the moment-forming current component $I_2$ does not change its value, while the flux-forming current component decreases in inverse proportion to the speed n. With this drive design, a sufficient distance from the overload torque must be maintained in the field weakening range, from the moment M. This is achieved by a low-leakage machine design and by the voltage increase.

If the multi-phase machine is put under greater stress at high speeds, the field-oriented control generates a reference voltage as the setting of the converter. This reference voltage is greater than the maximum converter output voltage, which can be generated as a function of an intermediate circuit voltage and at full block operation. In other words the regulation generates a setting for the converter, which the converter cannot follow since a corresponding output voltage would have to be greater than the maximum converter output voltage. Therefore, the actual flux no longer agrees with the reference flux. This causes departure from the field-oriented range and results in incorrect orientation.

If a cascade current control is used in the regulation concept, additional problems arise. Due to the incorrect flux setting, an incorrect magnetization current setting results, since the flux-forming current component $I_1$ is equal to the quotient of the flux $\psi$ and the main field inductance $L_n$ of the machine. To impress this reference current, a converter voltage is required which cannot be attained by the intermediate circuit. This puts the current circuit out of operation, and, incorrect orientation occurs again.

There is a need for a method and apparatus that corrects pre-controlled reference flux for a field-oriented control and prevents incorrect orientation of the field-oriented control.

SUMMARY OF THE INVENTION

This and other needs are satisfied by the present invention. A comparison is made between a reference voltage that is used as a setting for the converter and a predetermined maximum converter output voltage. A voltage control difference is generated from this comparison. With a flux correction controller, a flux control value is generated, from this voltage control difference which reduces the pre-controlled reference flux until the reference voltage for the converter is lower than or equal to the predetermined maximum converter output voltage again.

With this process, the pre-controlled reference flux is always corrected so that the reference voltage, which serves as the setting for the converter, is always lower than or equal to the maximum converter output voltage. This causes the actual flux and the reference flux to agree and prevents the regulation from leaving the field-oriented range. In addition, the flux-forming current component $I_1$ is always correctly formed by a reference current model in a control concept with cascade current control.

In the circuit according to the present invention, a control is provided comprising a reference current model, and/or a reference voltage model, and a converter-powered multi-phase machine with a speed detection device. A speed regulator and a characteristic line transmitter are arranged in front of the reference current model (and/or the reference voltage model). The generated reference voltage is passed to a second input of a second difference former. A maximum converter output voltage is applied to the first input of the difference former and the output of the difference former is coupled to a subsequent flux correction controller. The flux correction controller is limited on one side, and its output is coupled to an output of the characteristic line transmitter by means of a first difference former. The output of the first difference former is linked with an input of the reference current model (and/or the reference voltage model).

With this circuit, the reference flux for a field-oriented control, which comprises a reference current model and/or a reference voltage model, is corrected at all times as a function of the ratio of the reference voltage of the converter to the converter output voltage in simple manner. This means that the converter, which powers the multi-phase machine, can be utilized to maximum capacity.

DETAILED DESCRIPTION

Figure 1:
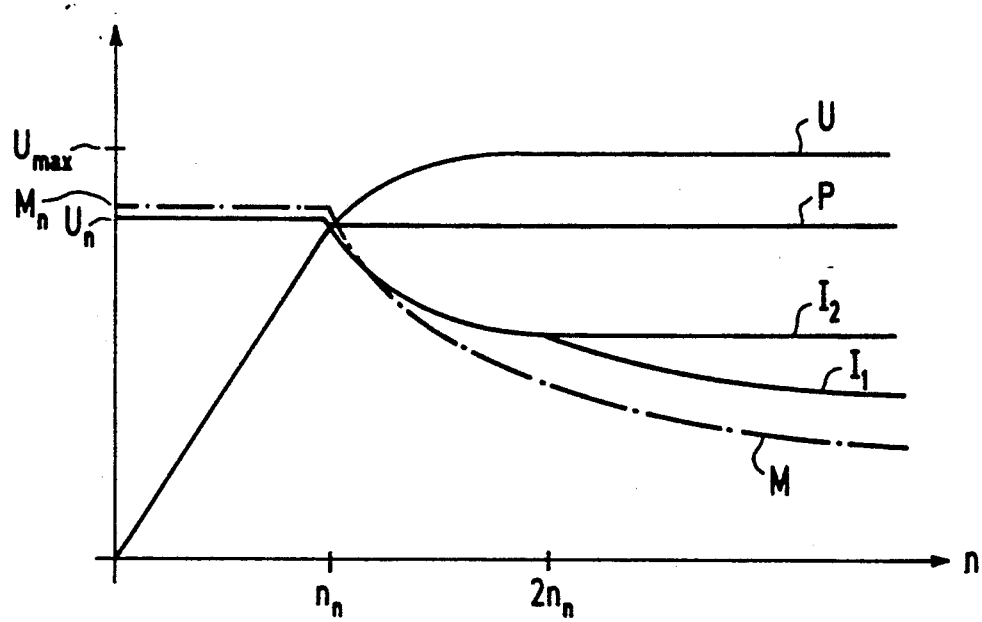
FIG. 1 is a graph of the progressions of specific machine values, plotted over the speed n.
Figure 2:
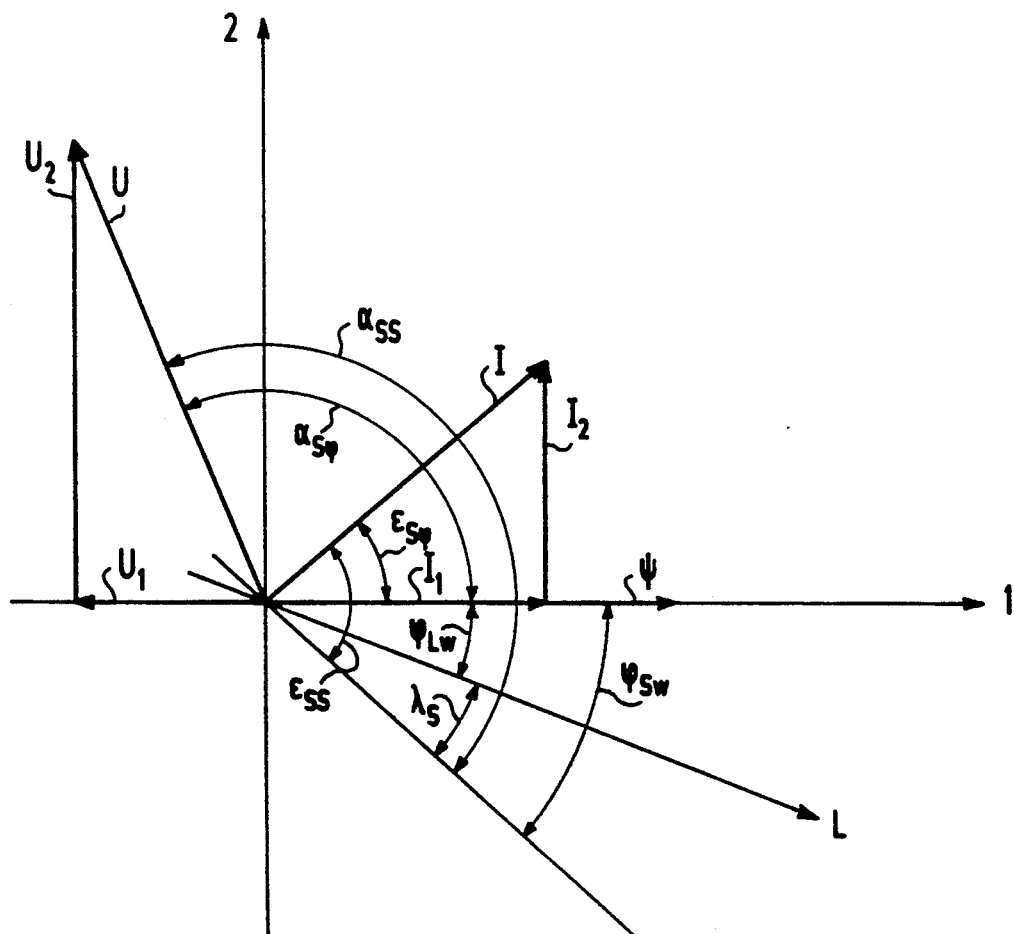
FIG. 2 is a pointer diagram of an asynchronous machine for field-oriented operation.

FIG. 2 shows a pointer diagram of an asynchronous machine for field-oriented operation. For simplification, signals for a two-pole machine are shown. In stationary operation, the space pointers of the stator voltage U, the stator current I and the rotor flux $\psi$ rotate at the stator frequency $f_1 = \psi_s$ relative to the stator axis S. The rotor of the machine rotates relative to the stator axis L at a speed of $n = \lambda_s$. The differential frequency at which the rotor axis L moves relative to the rotor flux axis 1, is the slip frequency $f_s = \phi_L$. If the stator current I is considered from the rotor flux axis 1, two constant components result. The current component $I_1$ runs parallel to the rotor flux axis 1 and the current component $I_2$ runs perpendicular to the rotor flux axis 1.

Field-oriented operation means that the stator current I and/or the stator voltage U of the machine can be set in such a way that the torque-forming current component $I_2$ and the flux-forming current component $I_1$ can be adjusted separately from one another. If the current component $I_1$ is kept constant, a constant rotor flux $\psi$ results. The mechanical torque M is the product of $\psi \cdot I_2$. The lane (i.e. voltage vector required for field-oriented operation) is calculated from reference values. The speed, the rotor position angle $\lambda_s$ and the machine parameters (e.g. main field reactance $X_h$, stator leakage reactance $X_S$, rotor leakage reactance $X_L$ and stator resistance $R_s$, are required for this calculation. The control is based on two different partial structures, the reference current model and the reference voltage model. In order to utilize the advantages of both systems, these can be linked with each other, as described in "Automatisierungstechnische Praxis atp," 29th year, Issue 2, 1987, pages 83 to 88.

Figure 3:
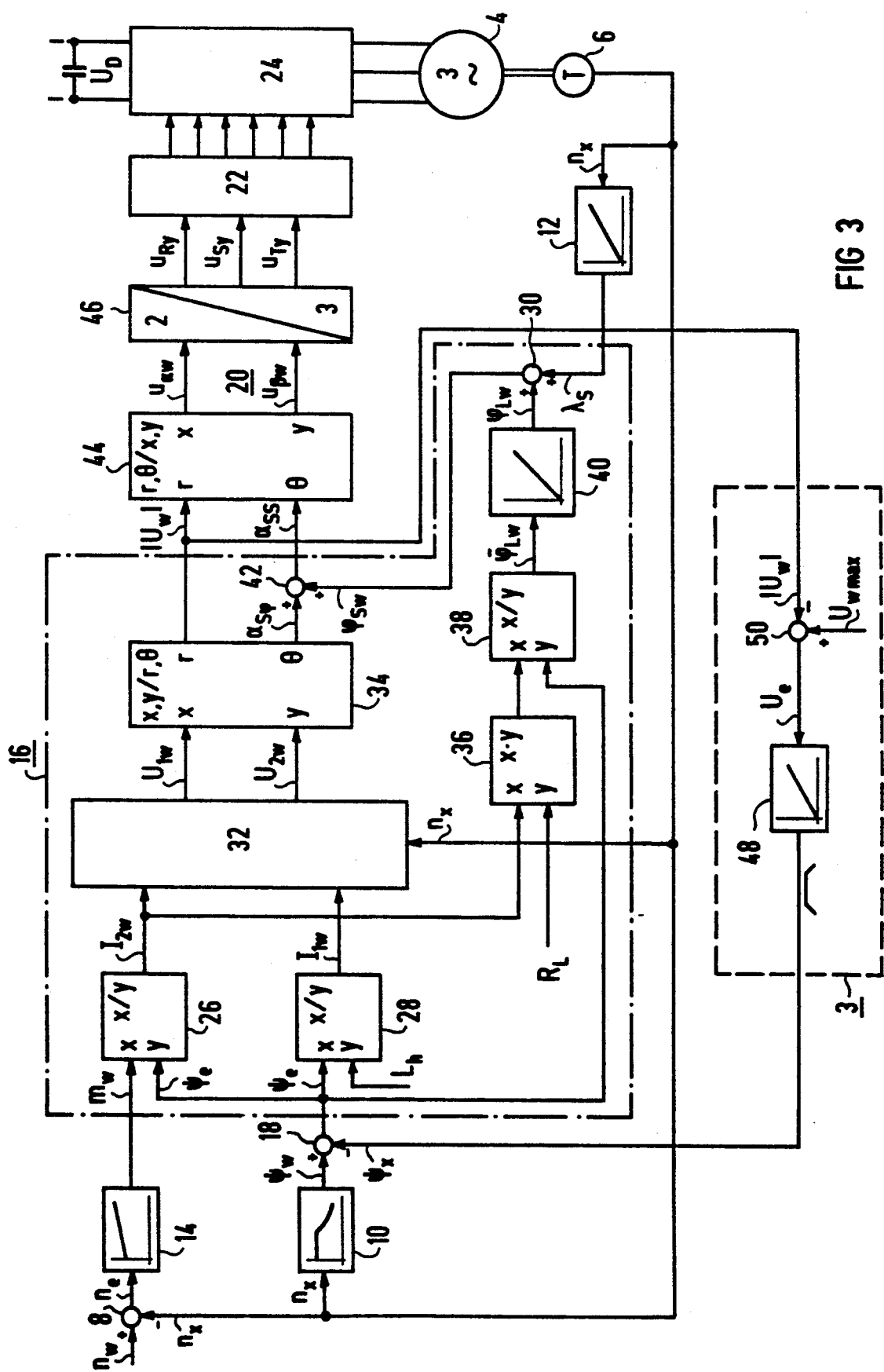
FIG. 3 is a block diagram of a field-oriented control with cascade voltage control and a reference flux correction circuit for a converter-powered asynchronous machine constructed according to the present invention and FIG. 4 is a block diagram of a field-oriented control with cascade current control and a reference flux correction for a converter-powered asynchronous machine constructed according to the present invention.

FIG. 3 shows a block schematic of a field-oriented control with cascade voltage control and the reference flux correction circuit 3 according to the invention, for a rotary current asynchronous machine, with a tacho generator 6 as a speed detection device. The tacho generator 6 yields an actual speed $n_x$, which is passed to a comparator 8, a characteristic line transmitter 10 for the reference flux $\psi_w$, and an integrator 12. The integrator 12 generates a rotor position angle $\lambda_s$ from the speed $n_x$. At the first input of the comparator 8, a reference speed $n_w$ is applied and is compared with the actual speed $n_r$. A speed difference $n_e$ is supplied to the output of the comparator 8 and passed to a speed regulator 14, which outputs a reference moment $m_w$. This reference moment $m_w$ is passed to a first input of a reference voltage model 16. At the second output of this reference voltage model 16, a corrected reference flux $\psi_e$ is applied, which is applied at the output of a first difference former 18. This difference former 18 is linked, on the input side, with the output of the flux controller 10, and the output of a reference flux correction circuit 3. A rotor position angle signal $\lambda_s$ is passed to a third input of the reference voltage model 16, which is generated from the actual speed $n_x$ by the integrator 12. The reference voltage model 16 is connected on its output side with a converter 24 which powers the rotary current asynchronous machine 4, via a coordinate converter arrangement 20 with a subsequent control set 22. The reference voltage model 16 comprises two quotient formers 26 and 28 and an adder 30 on the input side. In addition, the reference voltage model 16 comprises a processor unit 32, a C/P converter 34 (cartesian/polar), a multiplier 36, a second quotient former 38 and an integrator 40. The reference moment $m_w$ of the speed controller 14 is passed to the x input of the first quotient former 26, and the corrected reference flux $\psi_e$, which is also applied at the x input of the second quotient former 28, is passed to the y input. A main field inductance $L_h$ is passed to the y input of the second quotient former 28. As a result of the quotient formation of the input signals, the moment-forming reference current component $I_{2w}$ appears at the output of the first quotient former 26, and the flux-forming reference current component $I_{1w}$ appears at the output of the second quotient former 28. These reference current components $I_{1w}$ and $I_{2w}$ are passed to a processing unit 32. The actual speed $n_x$ is also passed to the processing unit 32. In a memory of this processing unit 32, machine parameters are stored, such as leakage inductances $X_{S\sigma}$ and $X_{L\sigma}$, the main field reactance $X_h$ and the stator resistance $R_S$. Using these stored values and the incoming signals, the reference voltage components $U_{1w}$ and $U_{2w}$ are calculated according to the following equations:

$$U_1 = I_1 R_S - I_2 X_\sigma$$

$$U_2 = I_1 X_\sigma + I_2 R_S + \phi \cdot \frac{1}{1 + \sigma_L} \cdot f_1$$

$$X_\sigma = X_{S\sigma} \cdot \frac{1}{1 + \sigma_L}$$

$$\sigma_L = \frac{X_{L\sigma}}{X_h}$$

$$f_1 = n_x + \phi_{Lw}$$

where
$X_\sigma$: leakage reactance
$X_{S\sigma}$: stator leakage reactance
$X_{L\sigma}$: rotor leakage reactance
$X_h$: main field reactance
$\sigma_L$: leakage coefficient
$f_1$: stator frequency
$n_x$: actual speed
$\phi_{Lw}$: reference slip frequency The reference voltage components $U_{1w}$ and $U_{2w}$ which are rectangular to each other and are converted to reference voltage value $|U_w|$ and an angle $\alpha_s$ by the C/P converter 34 the angle as indicates the angle between the stator voltage U and the rotor flux axis 1 according to FIG. 2, by means of the C/P converter 34.

The reference current component $I_{2w}$ generated is also passed to an x input of the multiplier 36, and the rotor resistance $R_L$ is applied to the y input of the multiplier 36. The output of the multiplier 36 is connected with the x input of the quotient former 38 and the y input is coupled to the output of the first difference former 18 (i.e. the x input of the two quotient formers 26 and 28 is coupled to the output of the first difference former 18 in each case). The reference slip frequency $\phi_{Lw}$ is applied to the output of the quotient former 38 and is converted to the reference load angle $\phi_{Lw}$ by the integrator 40. The rotor position angle $\lambda_S$ is added to this reference load angle $\phi_{Lw}$ resulting in the angle $\phi_{S2}$, which indicates the angle between the rotor flux axis 1 and the stator axis S as seen in FIG. 2. This angle $\phi_{Sw}$ is added to the angle $\alpha_S$ by another adder 42, and an angle $a_{SS}$ is formed at its output the angle $a_{SS}$ indicates the angle between the stator voltage U and the stator axis S as seen in FIG. 2.

A coordinate converter arrangement 20, is provided comprising a P/C converter 44 and a coordinate converter 46, the reference voltage value $|U_w|$, (i.e. the pointer magnitude $|U_w|$ and the angle $a_{SS}$, are converted into three settings $U_{Ry}$, $U_{Sy}$ and $U_{Ty}$. Phase reference voltages are formed from these settings $U_{Ry}$, $U_{Sy}$ and $U_{Ty}$ by the control set 22 and the converter 24.

The reference flux correction circuit 3, which is coupled to the first difference former 18 on its output side and with the reference voltage value $|U_W|$ output of the reference voltage model 16 on its input side. The reference flux correction circuit 3 comprises a flux correction controller 48, limited on one side, and a second difference former 50. The difference former 50 compares reference voltage value $|U_w|$ with a pre-determined maximum converter output voltage $U_{wmax}$, and a voltage controller difference $U_e$ is passed to the flux correction controller 48. The flux correction controller 48 generates a flux correction value $\psi_x$, which is passed to the second input of the first difference former 18. As soon as the reference voltage value, $|U_w|$ which serves as the setting for the converter 24, becomes greater than the predetermined maximum converter output voltage $U_{wmax}$, a voltage control difference $U_e$ is formed, so that the flux correction control 48 comes into action. In other words the flux correction value $\psi_x$ reduces the pre-controlled reference flux $\psi_w$ until the reference voltage value $|U_w|$ is lower than or equal to the maximum converter output voltage $U_{wmax}$ again. Due to the one-sided limitation of the flux correction regulator 48, the pre-controlled reference flux $\psi_w$ can only be reduced.

With this process, and circuit, the reference flux value always agree with the actual flux values of the rotary current asynchronous machine 4, which prevents departure from the field-oriented range. This is especially true at high speeds of a stressed rotary current asynchronous machine 4.

Figure 4:
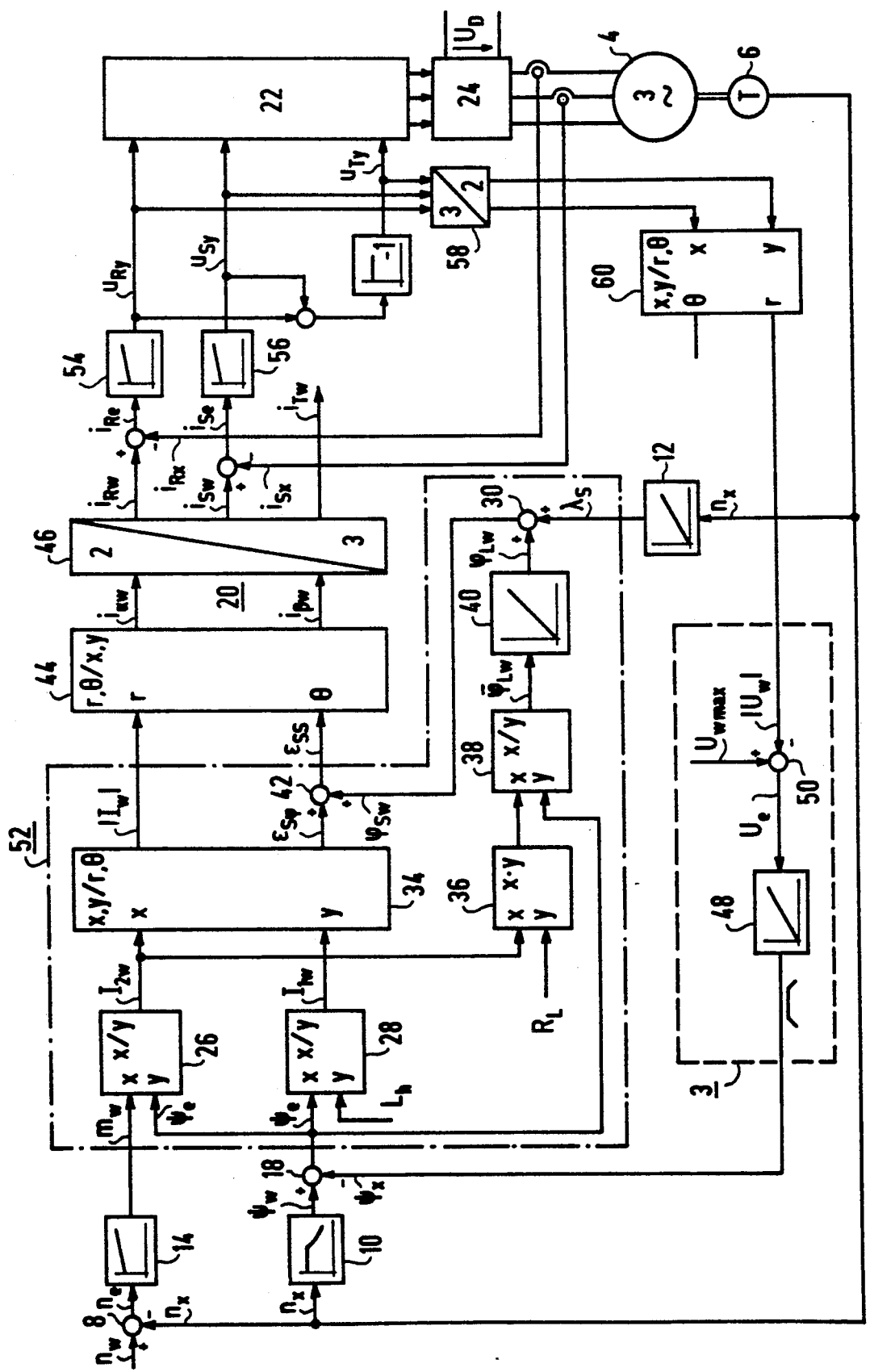

FIG. 4 illustrates a block diagram of a field-oriented control with a reference control model 52 and the reference flux correction circuit 3 of the present invention. Compared to the field-oriented control of FIG. 3, the reference current model 52 is structured in a simpler manner since no processing unit 32 is present. Since the block diagram of FIG. 3 differs only slightly from the block diagram of FIG. 4, the same reference symbols refer to the same blocks. Two of the three settings $i_{Rw}$, $i_{Sw}$ two phase current controllers 54 and 56. The three input variables $U_{Ry}$, $U_{Sy}$ and $U_{Ty}$ of the control set 22 are converted into a reference voltage value $|U_w|$ by a coordinate converter 58 with a subsequent C/P converter 60, and passed to the reference flux correction circuit 3. In addition, due to the correction of the pre-controlled reference flux $\psi_w$, the flux-forming reference current component $I_1$ is no longer incorrectly set.

We claim:

1. A method for correcting a pre-controlled reference flux for a field-oriented control device, said control device comprising a converter to power a multi-phase machine with a speed detection device and at least one of a reference current model and a reference voltage model, said control device detecting a characteristic of said converter, the method comprising:

generating a reference voltage value in dependence on said characteristic of said converter and said pre-controlled reference flux, said reference voltage value being used as a setting value for said converter;

generating a predetermined maximum converter output voltage value;

comparing said reference voltage value and said maximum converter output voltage value in a comparator;

generating a voltage control difference value in said comparator, said voltage control difference value equal to a difference in magnitude of said reference voltage value and said maximum converter output voltage value;

generating a flux control value from said voltage control difference in a flux correction controller; and reducing said pre-controlled reference flux with said flux control value until said reference voltage value is less than or equal in magnitude to said maximum converter output voltage value.

2. An apparatus for correcting a pre-controlled reference flux for a field oriented control device, said control device comprising:

a plurality of inputs and outputs and detecting a characteristic of said converter, said control device further comprising:

at least one of a reference current model and a reference voltage model;

a multi-phase machine powered by said converter; and a speed detection device coupled to said multi-phase machine;

a speed regulator coupled to an input of said control device;

a first comparator having at least two inputs and an output;

a characteristic line transmitter coupled to an input of said control device via said first comparator, said line transmitter generating said pre-controlled reference flux value;

a second comparator having at least two inputs and an output, a maximum converter output voltage value being supplied to a first input of said second comparator and a reference voltage value being supplied to a second input of said second comparator, said reference voltage value being generated in dependence on said characteristic of said converter and said pre-controlled reference flux, said reference voltage value being used as a setting value for said converter, a voltage control difference value being supplied to the output of said second comparator;

a flux correction controller having an input and an output, the input of said flux correction controller being coupled to the output of said second comparator, said flux correction controller supplying a flux control value to an input of said first comparator, such that said first comparator generates a corrected reference flux value equal to a difference in magnitude of said flux control value and said pre-determined reference flux value, said flux correction controller generating in flux control value until said reference voltage value is less or equal in magnitude than said maximum converter output voltage value.

* * * * *